United States Patent [19]
May et al.

[11] 3,934,542
[45] Jan. 27, 1976

[54] TRIANGULAR FOLDING REFLECTIVE FLARE HAVING WEIGHTED BASE

[75] Inventors: Louis May, Skokie; Edmund M. Idzik, Chicago, both of Ill.

[73] Assignee: Sate-Lite, Mfg. Co., Chicago, Ill.

[22] Filed: Mar. 11, 1974

[21] Appl. No.: 450,149

[52] U.S. Cl. ............................................. 116/63 P
[51] Int. Cl.² ........................ F01F 9/01; G08B 5/00
[58] Field of Search ............. 116/63 P, 63 R; 404/9; 248/364

[56] References Cited
UNITED STATES PATENTS

| | | | |
|---|---|---|---|
| 827,199 | 7/1906 | White | 248/364 |
| 2,625,130 | 1/1953 | Morser | 116/63 P |
| 3,596,628 | 8/1971 | Wright | 404/9 |

FOREIGN PATENTS OR APPLICATIONS

| | | | |
|---|---|---|---|
| 1,242,732 | 8/1960 | France | 116/63 P |
| 1,058,881 | 2/1967 | United Kingdom | 116/63 P |

*Primary Examiner*—S. Clement Swisher
*Assistant Examiner*—Denis E. Corr
*Attorney, Agent, or Firm*—Burmeister, York, Palmatier, Hamby & Jones

[57] ABSTRACT

A triagnular folding reflective flare is disclosed, of the type having a reflective lower member and two reflective side members which are connected together for relative movement between a triangular erected position and a folded position with the side members compactly folded relative to the lower member. A heavy base is movably connected to the lower member for movement between folded and unfolded positions. The base comprises a hollow member with a heavy material retained therein. The weight of the heavy material enhances the stability of the flare. The heavy material is preferably a highly economical material having considerable weight, such as concrete. However, the heavy material may comprise any suitable heavy aggregate mixed with any suitable binder, such as Portland cement, any other suitable mineral cement, an epoxy plastic or various other suitable plastic materials. The hollow member of the base may comprise two channel-shaped half-shells joined together to form a hollow tube for retaining the heavy material. The hollow member may also comprise a channel-shaped member having a cover for retaining the heavy material. If desired, the hollow member may comprise a channel-shaped member having an inwardly projecting flange or the like for interlocking with the heavy material.

2 Claims, 8 Drawing Figures

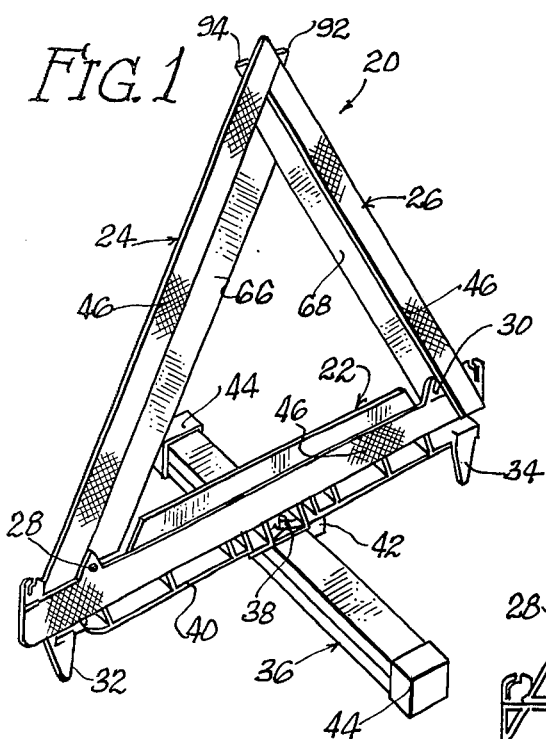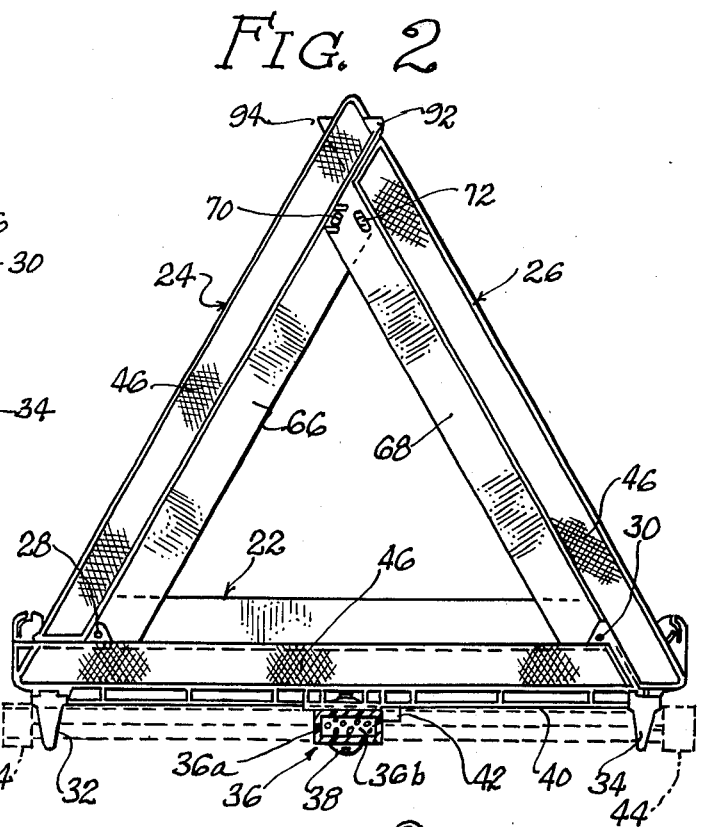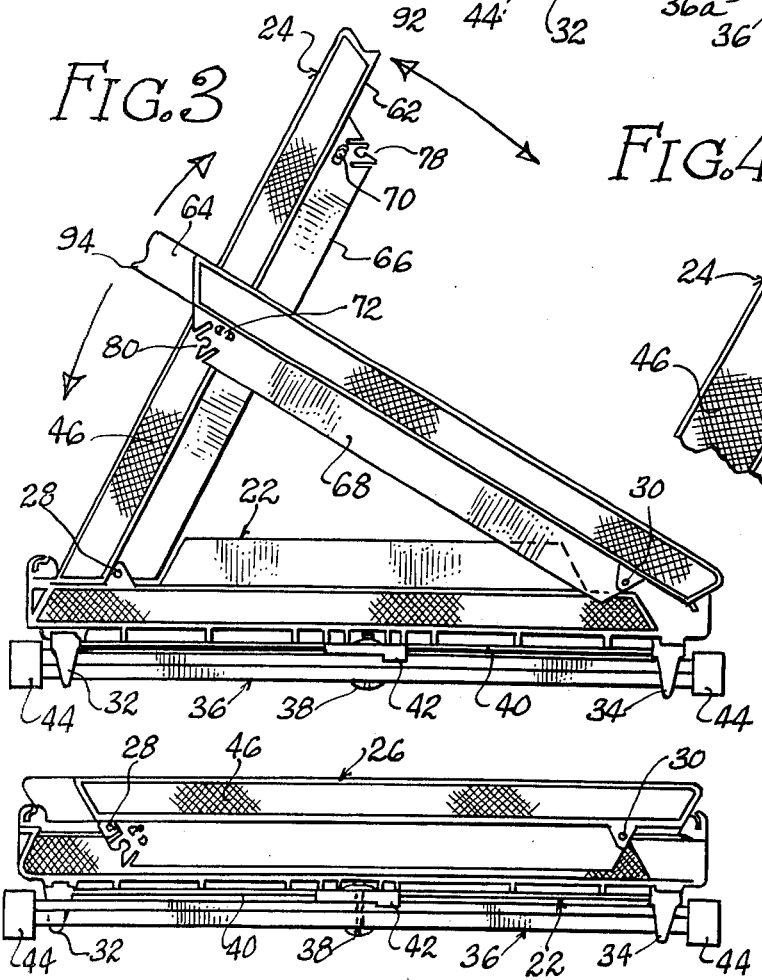

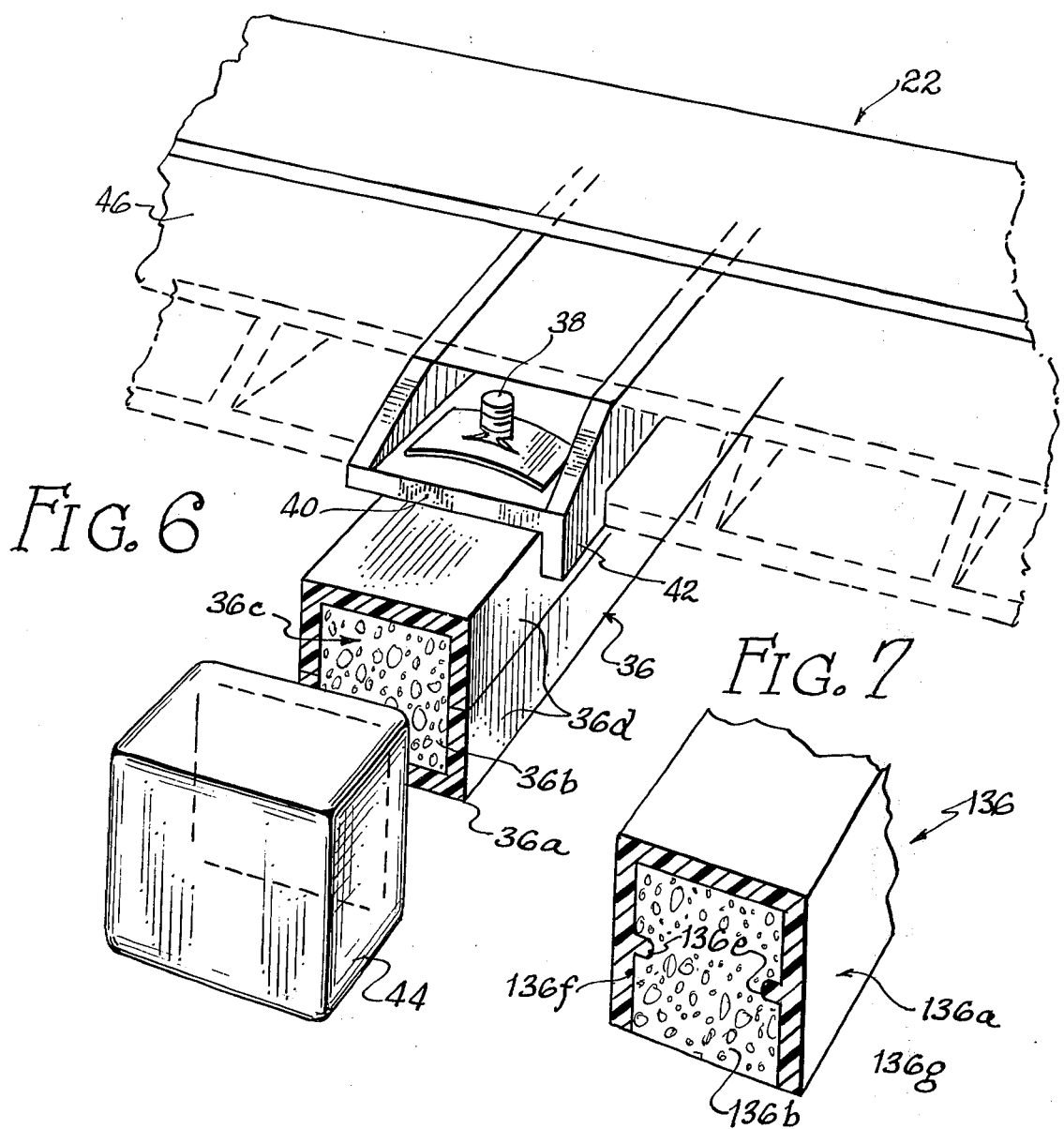
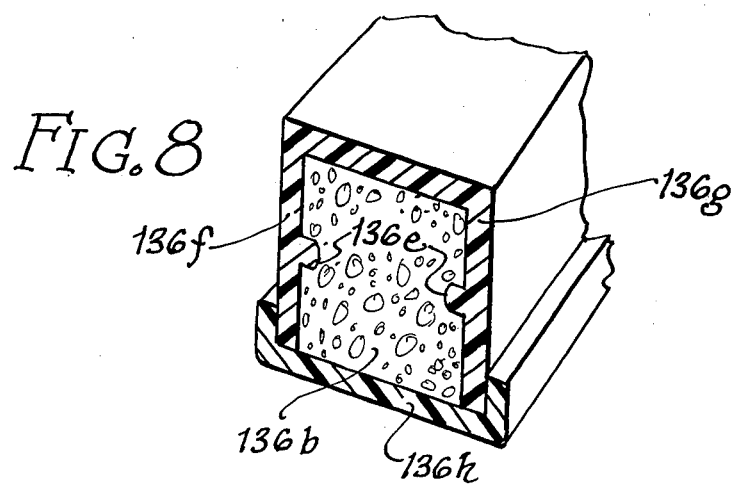

TRIANGULAR FOLDING REFLECTIVE FLARE HAVING WEIGHTED BASE

This invention relates to a triangular folding reflective flare of the type comprising a lower reflective member and two reflective side members which are foldably connected thereto for movement between a triangular erected position and a folded position, with the side members compactly folded relative to the lower member. A heavy base may be foldably connected to the lower member, so that the flare will stand upright with sufficient stability to resist being tipped over by high winds.

Heretofore, folding reflective flares have generally employed base members made of solid steel, which provides sufficient weight, but is quite expensive.

One object of the present invention is to provide a new and improved folding reflective flare having a new base construction which affords sufficient weight for great stability, yet is much more economical than solid steel or the like.

A further object is to provide such a new and improved folding reflective flare having a base construction utilizing materials which are plentiful and readily available, as well as being highly effective and economical. Thus, the present invention preferably comprises a triangular folding reflective flare comprising a lower reflective member and two reflective side members foldably connected thereto for movement between a triangular erected position and a folded position, in which the side members are compactly folded relative to the lower member. A heavy base is foldably connected to the lower member, for movement between folded and unfolded positions. The base preferably comprises a hollow member with a heavy material retained therein to give the base sufficient weight for the required stability. It is preferred to employ a heavy material which is highly economical, such as concrete. However, the heavy material may comprise any suitable heavy aggregate mixed with a suitable binder, such as Portland cement, any other suitable mineral cement, an epoxy plastic, or various other plastic materials, for example. The heavy material may also comprise a granular aggregate or any other loose material.

The hollow member to hold the heavy material may comprise a pair of half-shells joined together to retain the heavy material. The half-shells may be made of a resinous plastic material or any other suitable material. The hollow member may also be channel-shaped, with a cover to retain the heavy material. Alternatively, the hollow member may be channel-shaped and may be provided with an inwardly projecting flange or some other element, adapted to interlock with the heavy material.

Further objects, advantages and features of the present invention will appear from the following description, taken with the accompanying drawings, in which:

FIG. 1 is a perspective view of a triangular folding reflective flare to be described as an illustrative embodiment of the present invention, the flare being shown in its fully erected condition.

FIG. 2 is a front elevation of the flare, with the foldable base shown in section.

FIG. 3 is a front elevation showing the flare with the base folded, and with one of the side members partially folded.

FIG. 4 is an enlarged fragmentary front elevation showing additional details of the side members, including the latching elements on the upper ends thereof.

FIG. 5 is a front elevation showing the flare in its fully folded condition.

FIG. 6 is a fragmentary enlarged perspective view showing additional details of the weighted base for the flare.

FIGS. 7 and 8 are fragmentary sectional perspective views showing modified base constructions for the flare.

As just indicated, FIGS. 1–3 illustrate a triangular folding reflective flare 20 adapted to be carried in an automobile or any other vehicle in a folded condition, as shown in FIG. 5, so that the flare can be erected and placed along the roadway behind the vehicle as a warning to approaching motorists, in the event that the vehicle becomes disabled. The flare 20 reflects the lights of the approaching vehicles so that the drivers of such vehicles will see the flare as a brilliant triangle.

The illustrated flare 20 comprises a reflective lower member 22 and a pair of reflective side members 24 and 26 which are foldably connected to the opposite ends of the lower member 22, so that the side members can be swung upwardly to their inclined erected positions, as shown in FIGS. 1 and 2. Pivot pins or rivets 28 and 30 may be provided between the lower member 22 and the side members 24 and 26. The side members 24 and 26 are swingable downwardly to their folded positions, adjacent the lower member 22, as shown in FIG. 5.

The illustrated lower member 22 has downwardly projecting feet 32 and 34 near its opposite ends, for engaging the ground or some other supporting surface. To enable the flare 20 to stand erect in a strong wind, the lower member 22 is preferably fitted with a heavy folding weighted base or cross member 36, which may be in the form of a hollow member or shell 36a containing a heavy material 36b, such as concrete, cement, epoxy or other plastic materials mixed with a heavy aggregate or filler material, various other binders mixed with a filler, or a loose granular or liquid filler, for example, as will be described in greater detail presently. The hollow shell 36a may be made of a resinous plastic material, metal or any other suitable material.

A swivel connection is preferably provided between the lower member 22 and the base 36 so that the base can be folded into a position in which it is parallel to the lower member, as shown in FIGS. 4 and 5. In the illustrated construction, such swivel connection is provided by a swivel bolt 38, extending through openings in the base 36 and in a horizontal flange 40 on the lower member 22. The swiveling movement of the base 36 is preferably limited by a pair of stop elements 42 projecting downwardly from the lower member 22. As shown in FIGS. 3 and 5, the base 36 is engageable with the sides of stop elements 42 when the base 36 is folded so as to extend parallel to the lower member 22. The base 36 engages the ends of the stop elements 42 when the base is unfolded so as to extend at right angles to the lower member 22, as shown in FIG. 1.

To prevent the flare 20 from sliding along a pavement surface, it is preferred to provide the base 36 with non-skid feet, which may take the form of end caps 44 made of natural or synthetic rubber, or some other similar material.

The lower member 22 and the side members 24 and 26 are preferably made of some durable yet inexpensive material, such as various resinous plastic materials. The material may be brightly colored for a high degree of visibility. For example, the lower member 22 and the side members 24 and 26 may be made of a plastic material having a bright fluorescent orange color.

To provide high visibility at night, the lower and side member 22, 24 and 26 are preferably fitted with reflectors 46 which may be of the many faceted prismatic lens type. Thus, the illustrated reflectors 46 are in the form of plates made of transparent material, such as a suitable resinous plastic material. The reflectors 46 may be of a red color, or some other bright color. The rear sides of the lenses 46 may be molded or otherwise formed with a multitude of prism facets which produce total internal reflection of incident light.

The upper end portions of the illustrated side members 24 and 26 have mating half-lap portions 62 and 64 which are adapted to overlap so as to form a half-lap joint when the side members 24 and 26 are erected and joined together, as shown in FIGS. 1, 2 and 4. In FIGS. 2, 3 and 4, the side member 24 is to the rear of the lower member 22, while the side member 26 is in fromt of the lower member. It will be evident, however, that the half-lap portions 62 and 64 overlap in the opposite sense. Thus, the half-lap 62 is adapted to extend in front of the half-lap portion 64 when these portions are overlapped.

In addition to the half-lap portions 62 and 64, the joint between the side members 24 and 26 utilizes longitudinal flanges or fins 66 and 68 extending along the lower edges of the side members 24 and 26, respectively. These fins 66 and 68 are also adapted to overlap, as will be evident from FIGS. 1, 2 and 4. The fins 66 and 68 overlap in the opposite sense from the half-lap portions 62 and 64. Thus, the fin 68 on the side member 26 is adapted to extend in front of the fin 66 on the side member 24. A highly secure joint is formed between the side members 24 and 26 as the result of arranging the half-lap portions 62 and 64 and the fins 66 and 68 so as to overlap in opposite senses.

Latching elements are preferably provided on the side member 24 and 26 to latch them together in their erected positions. The arrangement of the latching elements is such that they hold securely yet are easy to connect and disconnect. In the illustrated construction, the latching elements comprise pin elements 70 and 72 projecting laterally from the fins or flanges 66 and 68. It will be seen that the pin element 70 projects forwardly from the fin 66, while the pin element 72 projects rearwardly from the fin 68. The pin elements 70 and 72 may be molded in one piece with the fins or flanges 66 and 68.

In addition to the pin elements 70 and 72, the fins or flanges 66 and 68 are preferably formed with latching clip slots 78 and 80 which are adapted to receive the pin elements 72 and 70 on the opposite side members. The slots 78 and 80 are preferably shaped to provide a detent action with the pin elements 70 and 72 so that the pin elements will be detained in the slots.

The latching joint between the side members 24 and 26 can be assembled very easily by overlapping the fins 66 and 68 and pushing the side members together so that the pin element 70 enters the latching slot 80, while the pin element 72 enters the latching slot 78. The side members 24 and 26 are shown fully assembled in FIGS. 1, 2 and 4.

The disconnection of the latching joint between the side members 24 and 26 may be facilitated by providing end elements or tabs 92 and 94 which project from the ends of the side members 24 and 26 and are adapted to extend beyond the opposite side members, as will be evident from FIGS. 1, 2 and 4. The latching joint between the side members 24 and 26 can easily be disconnected by applying a squeezing force between the end elements 92 and 94, as indicated by the arrows in FIG. 4. The squeezing force causes the side members 24 and 26 to swing apart, so that the pin elements 70 and 72 are withdrawn from the latching slots 80 and 78.

This invention provides an improved, inexpensive weighted base used on any triangular flare, to hold down the flare in order to withstand a 40 mile per hour wind, in conformity with Federal Standard No. 125.

With the advent of the federal regulations on a triangle warning device, a variety of designs have been introduced into the market. Due to the 40 m.p.h. wind requirement, they all have the common requirement of a certain weight, approximately 2.5 pounds, to give the device enough stability so that it will withstand a 40 m.p.h. wind.

Up until the present time, it has been the prevailing practice to construct triangular folding reflective flare devices with bases made of solid steel, to provide the desired weight. If this construction is continued, huge amounts of steel will be required to produce the large number of flare devices to be required by federal safety standards. However, steel is expensive and in short supply. To solve this problem, the flare construction of the present invention eliminates the use of steel to provide the needed weight in the base of the flare. The present invention utilizes much more abundant and economical materials, to afford great savings in cost.

As previously indicated, the construction of the illustrated base 36 involves a hollow member or shell 36a, made of any desired inexpensive material. The shell 36a contains or is filled with an inexpensive yet heavy filler material 36b such as concrete, cement or any other suitable material, which may be in solid or liquid form.

It is recognized that there are few inexpensive materials with a specific gravity greater than that of steel. However, due to the availability of space, materials with lower specific gravities can be employed to fill up the shell, thus making a base which weighs as much as a steel base, but with a larger volume.

The base construction of the present invention thus utilizes a hollow member or shell, containing or filled up with any heavy inexpensive available filler, such as cement, concrete, or any other known or suitable material.

The shape of the base 36 will ordinarily be determined by the most desirable physical shape required by the design of the triangular reflective flare. Whatever the shape, however, the base comprises the hollow shell 36a, which can be produced either in one piece or in two or more pieces, fused or otherwise secured together, so as to create a hollow container. The hollow member or shell 36a may be molded or otherwise formed of a suitable resinous plastic material, or may be made of metal or any other suitable material.

The heavy filler material 36b can be introduced into the shell 36a either before or after encapsulation. Thus, the filler material can be poured or otherwise inserted into the shell while the filler material is in a fluid or semifluid state, following which the material is allowed to set or harden. Alternatively, the filler material can be precast or preset in a convenient shape and then inserted into the shell in a set or solid condition. The encapsulation of the shell is then completed.

In the case of a filler material supplied in a pourable state, the base container 36a may have an opening 36c at one end, such that the container can be filled like a bottle.

Rather than being made of concrete or some other material which solidifies after being poured, the filler material 36b may comprise a granular material, such as sand, or any other suitable loose material. The filler material may also comprise a liquid material, such as water, for example, either by itself, or mixed with a solid granular or loose material. In the case of a solid material, the filler may comprise any suitable heavy aggregate, such as sand, gravel, metal filings, metal pieces or the like, mixed with any suitable binder, such as Portland cement, any other suitable mineral cement, an epoxy plastic material, any other suitable plastic material, or any suitable mastic or adhesive material.

As illustrated in FIG. 6, the hollow member or shell 36b of the base 36 is made of a resinous plastic material and is in the form of an elongated tube having a rectangular cross section. The illustrated shell 36b comprises two channel-shaped half-shells 36d which are fused, cemented or otherwise joined together. The filler material 36b may be cast in place within the hollow tubular member or shell 36a, or may be precast and inserted between the half-shells 36d, before they are welded, heat sealed, cemented or otherwise joined together. The opposite ends of the base 36 are closed and covered by the rubber end caps 44, which also prevent the base from slipping or skidding along a supporting surface.

FIG. 7 illustrates a modified base 136, comprising a hollow member 136a which is channel-shaped in cross section. A heavy filter material 136b is contained within the hollow elongated member 136a. As before, the filler material 136b is preferably concrete, but any other suitable filler material may be employed. In the case of concrete, the filler material 136b is cast in place within the channel-shaped hollow member 136a. The concrete is poured into the hollow member 136a while the concrete is still in a plastic state. The concrete is then allowed to harden or set within the hollow member 136a.

To retain the filler material 136b, the hollow channel-shaped member 136a is preferably formed with one or more inwardly projecting elements 136e, adapted to interlock with the filler material. In this case, the inwardly projecting elements 136e are in the form of longitudinal flanges or fins, projecting inwardly from the side walls 136f and g of the channel-shaped member 136a.

FIG. 8 shows a base construction which is the same as that of FIG. 7, except that the hollow channel-shaped member 136a is closed by a cover 136h which is also channel-shaped. The cover 136h may be made of a resinous plastic material, or any other suitable material. Preferably, the cover 136h is snugly fitted around the open edge of the channel-shaped member 136a and may be fused, heat sealed, welded, cemented or otherwise secured in place.

The cover 136h encloses and conceals the heavy filler material 136b and permits the use of a granular, loose or liquid filler material.

We claim:

1. A triangular folding reflective flare,
comprising a lower member and two side members movably connected thereto for folding and unfolding movement between a triangular erected position and a folded position with said side members compactly folded relative to said lower member,
and an elongated base having a pivotal connection to said lower member for swinging movement relative thereto between folded and unfolded positions,
said base comprising a hollow member in the form of a pair of elongated generally channel-shaped half shells made of a resinous plastic material and joined together to form a hollow tube,
and a heavy material in the form of concrete retained within said hollow member.

2. A triangular folding reflective flare,
comprising a lower member and two side members movably connected thereto for folding and unfolding movement between a triangular erected position and a folded position with said side members compactly folded relative to said lower member,
and an elongated base having a pivotal connection to said lower member for swinging movement relative thereto between folded and unfolded positions,
said base comprising a generally channel-shaped member having two opposite side walls and a connecting wall extending therebetween with an open side opposite said connecting wall,
a heavy material comprising a heavy aggregate mixed with a binder and received within said channel-shaped member,
and a cover wall secured to said channel-shaped member and closing said open side to retain said heavy material.

* * * * *